Feb. 24, 1959 S. PARISER 2,875,440

HIGH PERFORMANCE TELEVISION INDOOR ANTENNA

Filed Dec. 19, 1957 3 Sheets-Sheet 1

INVENTOR.
SIDNEY PARISER

BY Ostrolenk, Faber, Gerb & Soffen
ATTORNEYS

HIGH PERFORMANCE TELEVISION INDOOR ANTENNA

Filed Dec. 19, 1957 3 Sheets-Sheet 2

INVENTOR.
SIDNEY PARISER
BY Ostrolenk, Faber, Gerb & Soffen
ATTORNEYS

HIGH PERFORMANCE TELEVISION INDOOR ANTENNA

Filed Dec. 19, 1957

INVENTOR.
SIDNEY PARISER
BY Ostrolenk, Faber, Gerb & Soffen
ATTORNEYS

United States Patent Office 2,875,440

Patented Feb. 24, 1959

2,875,440

HIGH PERFORMANCE TELEVISION INDOOR ANTENNA

Sidney Pariser, Mount Vernon, N. Y., assignor to Radio Merchandise Sales Inc., New York, N. Y., a corporation of New York Application December 19, 1957, Serial No. 703,947

20 Claims. (Cl. 343—802)

The present invention relates generally to indoor antennae, and more particularly relates to novel high performance indoor antennae particularly suited for the reception of V. H. F. broadcast television signals.

The V. H. F. or "very high frequency" range of television broadcasting incorporates two bands. These are known as the low and high bands. The low band encompasses the signal frequencies of 54 to 88 megacycles; the high band, 174 to 216 megacycles. The twelve V. H. F. television channels (2) to (13) are allocated in six megacycles band widths throughout the aforesaid low and high bands. Such wide range of signal reception, namely signals from 54 to 216 megacycles, has in the past been difficult to receive efficiently with a practical indoor antenna.

The present invention is directed to overcome inefficiencies, towards effecting overall high performance reception by indoor antennae.

An important feature of the present invention is the provision of a novel phasing element in each colinear telescoping arm of a dipole antenna array, connectible into the circuit of each of the telescoping arms when extended. An important characteristic of the invention phasing element is that it serves as a phasing stub when the antenna is in its extended reception position, whereby the high band frequencies, namely channels (7) to (13), are effectively received, as will be set forth in detail hereinafter.

The effective lengths of the dipole sections used with the intermediately series connected phasing elements, are proportioned to be efficient in such high frequency band. For the low frequency band reception, namely of channels (2) to (6), these phasing elements of the present invention become effective receptors of the direct signal energy and extend the effective physical length of each of the dipole arms for efficient reception of the low band channels.

The invention indoor antenna is compact, simple and relatively inexpensive for the high performance effected therewith. The novel phasing loops automatically incorporated in each of the dipole circuits when the antenna is extended for reception purposes, serves the dual important function of significantly raising the efficiency of reception by the dipole antenna for the high band signals as compared to dipole antenna of the prior art of equivalent physical length; while at the same time it is effective at the low band channels for effectively extending the physical dipole length for efficient reception of the low band channels. Accordingly, the performance of the invention dipole antenna is significantly more efficient than prior antenna of this class, and reception of signals from stations more remote become possible therewith. Also, regular signal reception produces clearer and sharper pictures as a result of the greater efficiency of the signals received throughout the V. H. F. range by the invention indoor antenna.

In accordance with a further important feature of the present invention an auxiliary phasing element is provided for variable interconnection with each of the arm sections of the dipole. A multiple position switch is provided with the antenna to interconnect each of the arms, the auxiliary phasing element to the antenna output leads in a multiplicity of circuital relationships as will be set forth in more detail hereinafter. The result of such interswitching of the auxiliary phasing element and dipole arms is a direct effective and ready arrangement for eliminating annoying television reception disturbances, such as ghosts, snow, interference, Venetian blinds, etc.

Such auxiliary phasing element, and the interswitching thereof with a dipole together with the interposed phasing elements in the dipole arms referred to hereinabove, results in a compact highly efficient receptor of V. H. F. broadcast television signals on all its channels, with results equivalent to a regular outdoor antenna. An additional advantage is the adjustability and flexibility of arrangement of the indoor antenna of the present invention for specific reception problem areas, or multiple station directions for which an ordinary outdoor antenna installation is not comparable.

It is accordingly a primary object of the present invention to provide an indoor antenna for the reception of television signals having a novel interposable phasing element in a dipole arm, which effectively improves the performance of the antenna throughout both the low and high band channels.

Another object of the present invention is to provide a novel indoor television antenna having colinear telescoping arms forming the dipole sections, with a phasing element automatically connected to each telescoping section when extended for reception.

A further object of the present invention is to provide a novel indoor antenna having novel phasing elements interposed in each of the dipole arms to serve as a phasing stub for the high band channels and as an effective length increasor for the dipole arms during low band channels reception.

Still another object of the present invention is to provide a novel indoor television dipole antenna with colinear telescoping arms in combination with individual phasing elements that automatically connect sections of said arms in electrical series for improving the antenna reception performance.

Still another object of the present invention is to provide a novel indoor dipole antenna for the reception of V. H. F. television signals incorporating an auxiliary phasing element interconnectible with the dipole arms in a multiplicity of circuital relations.

A further object of the present invention is to provide a novel indoor antenna for V. H. F. television reception incorporating a phasing element variably interconnectable with the dipole arms for substantially eleminating annoying reception disturbances such as ghosts, snow, Venetian blinds, etc.

The above and further objects of the present invention will become more apparent in the following description of an exemplary embodiment illustrated in the drawings, in which.

Figures 1, 2:
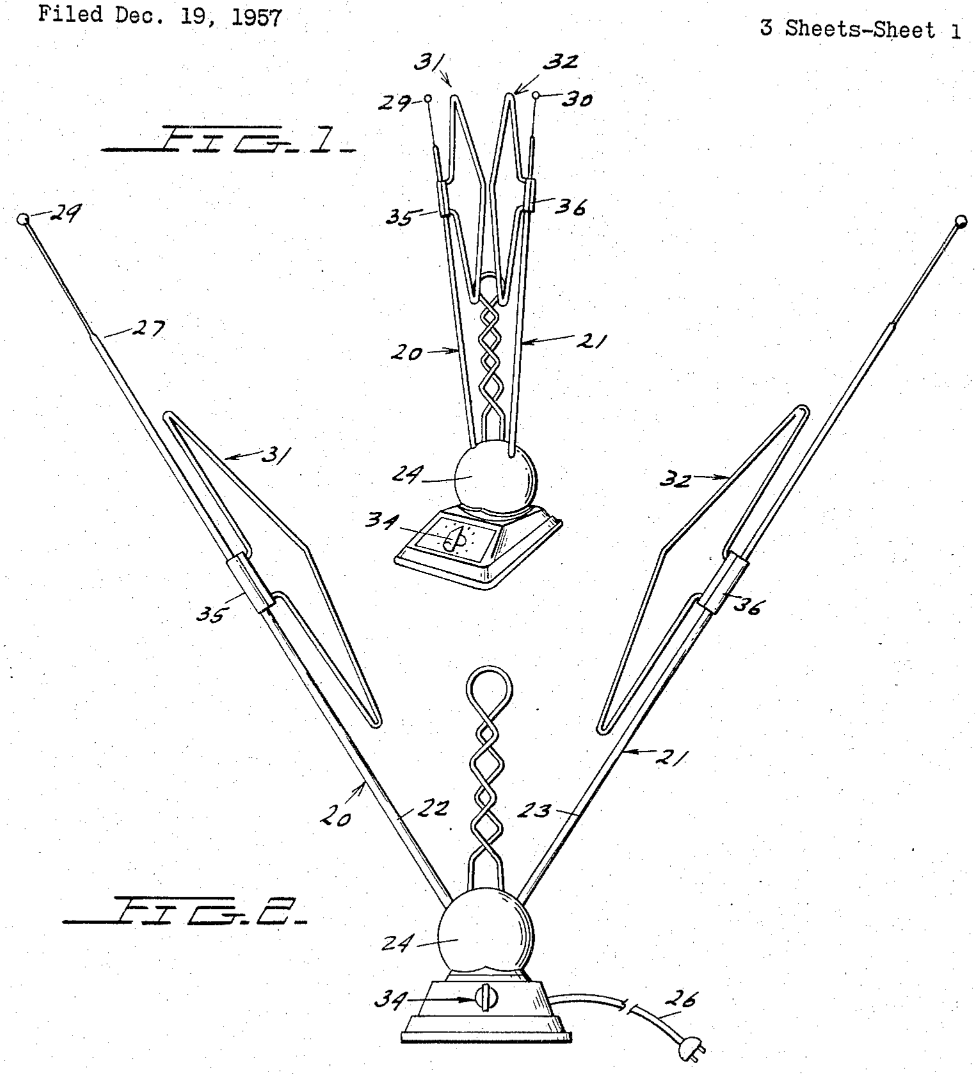
Fig. 1 is a perspective illustration of the exemplary indoor antenna in its closed non-receiving position.
Fig. 2 is an enlarged elevational view of the exemplary antenna in fully extended condition.

Figures 1 and 2 are respectively perspective and front views of the exemplary indoor antenna. Perspective Figure 1 is with dipole arms 20, 21 in upright position, which is generally a non-reception or packaging condition. The dipole arms 20, 21 each comprise a hollow metallic rod 22, 23 pivotally supported in base 24 in the usual manner of indoor dipole antennae. The base 24 contains a slot 25 for the pivoting of arm 23 by the operator and a corresponding slot for arm 22. Suitable frictional mounting of arms 20, 21 in base 24 permits stable location of each arm in positions set by the operator for desired reception. Each rod 22, 23 is suitably electrically connected to respective leads of output cable 26.

Figure 3:
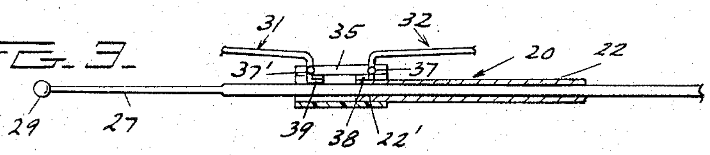
Fig. 3 is an enlarged cross sectional view at the phasing loop portion of a telescopic dipole arm in its closed position.
Figure 5:
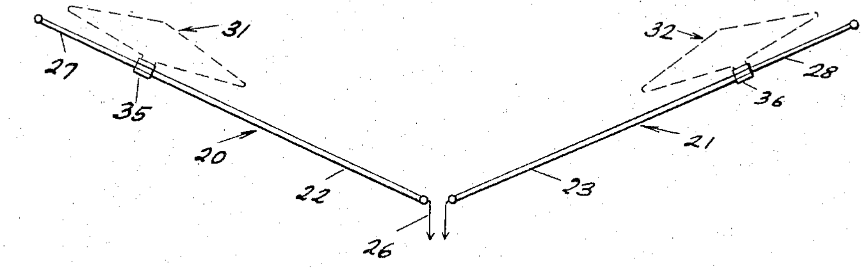
Fig. 5 is a schematic illustration of the exemplary antenna in reception condition with the colinear telescopic arms and conductors retracted.

Each tubular conductor 22, 23 contains a rod 27, 28 that are in colinear telescoping arrangement within tubes 22, 23. A decorative safety tip of insulation material 29, 30 are mounted on the ends of rods 27, 28 respectively. When rods 27, 28 are recessed within their respective metallic tubes 22, 23 as shown in Figures 1, 3 and 5 and effective electrical interconnection is maintained as by physical contact to produce an effective electrical length for each of the arms 20, 21 equivalent to the length of each tube 22, 23 and the exposed portion of its rod 27, 28.

Figures 2, 4, 6 and 7 correspond to the extended position of the rods 27, 28 colinear with the tubes 22, 23. In the latter position, there is brought into circuit in each of the dipole arms 20, 21 respective phasing elements 31, 32 as more fully set forth hereinafter. A central auxiliary element 33 extends from the antenna base 24 and is electrically interconnected in the dipole circuit through the multiposition switch 34 to be described.

Figure 4:
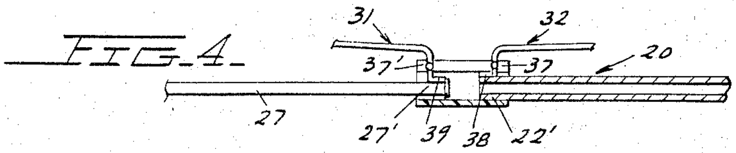
Fig. 4 is a cross-sectional view corresponding to Fig. 3, with the telescopic arm fully extended and the phasing element in series electrical relation therewith.

Figure 2 illustrates the antenna in an extended receiving condition. The dipole arms 20, 21 are spread apart in the usual manner. Their subtended angle is adjusted as desired or as reception conditions dictate, with the outer rods 27, 28 fully extended as shown in Figures 2 and 4. The phasing loops 31 and 32 are interconnected respectively between rod 27 and tube 22 on the one hand, and rod 28 and tube 23 on the other hand. Such interconnection places the respective loops 31 and 32 in electrical series between the sections of the respective dipole arms 20 and 21, for the advantageous purposes to be fully set forth.

Each of the dipole arms 20 and 21 when extended contain the diamond shaped loops 31 and 32 in electrical series connection within their arm sections 22, 27 and 23, 28 respectively. The diamond phasing elements 31 and 32 are respectively supported on the upper ends of tubes 22 and 23 through insulation mounting members 35, 36. The respective upper dipole rods 27, 28 move through members 35, 36. Figures 3 and 4 are enlarged cross-sectional views of the antenna sections wherein the looped phasing elements 31 and 32 are mounted and interconnected.

Figures 3 and 4 illustrate the arrangement of antenna phasing loop 31 on arm 20. It is to be understood the same arrangement applies for loop 32 and arm 21. The position of rod 27 is telescoped within tube 22 in Figure 3. The insulation 35 is secured at the tip or end 22' of tube 22. Also, the ends 37, 37' of loop 31 are fastened to member 35. Loop end 37 extends to contact 38 interior of member 35 and in electrical connection with tip 22' of tube 22. A further contact 39 connects with loop end 37' and is arranged to electrically connect with the slidable rod 27. A spring biased element for contact 39 insures good contact.

In the extended position as shown in Figure 4, the contact 39 engages electrically with the interior end or tip 27' of rod 27. As clearly shown, the rod 27 is mechanically and electrically separate from tube 22 in the extended position, and the phasing loop 31 is electrically interposed therebetween. Tube 22 is in electrical series with loop 31 through contact 38 and through the loop to contact 39 to rod 27. The electrical series relationship of these three elements is significant as will be set forth hereinafter in more detail.

As is evident from Figure 3, during the retracted position of rod 27 within tube 22 electrical connection is made between the rod and tube and loop 31 is preferably though not necessarily if desired short-circuited across contacts 37, 39. Effectively therefore, this phasing loop 31 is out of circuit in the dipole arm 20 during such position of the rod 27 within the tube 22. A corresponding short-circuiting of the phasing loop 32 of dipole arm occurs when the rod 28 is telescoped within tube 23. Also, when both rods 27 and 28 are in their extended position, corresponding to Figures 2 and 4, the phasing loops 31 and 32 are automatically interconnected in the series between the rods 27 and 28 and their respective tubes 22 and 23.

Figure 5 illustrates diagrammatically the relationship of rods 27, 28 when within their respective tubes 22, 23. The dipoles 20, 21 are angularly spread in a reception condition. The rods 27, 28 serve to merely extend the effective dipole length in conjunction with their associated tubes 22, 23 for electrical reception at lead-ins 26. The phasing loops 31 and 32 are indicated in dotted lines to illustrate their short-circuiting out of the circuit for this purpose. It has been found that in strong signal areas or near a station, such condition of the antenna as depicted by Figure 5 results in good reception.

The phasing loops 31, 32 add additional capacity to the dipole arms 20, 21 when in their collapsed mode, resulting in an electrical increase in their wave lengths. Accordingly, the reception in strong signal areas by the invention antenna is effective with efficient reception in such collapsed condition as shown in Figure 5.

The interconnection of the auxiliary phasing element 33 in conjunction with the multiple switching means 34, (see Figures 1 and 2) with the dipole arms 20 and 21 of Figure 5 is of course indicated for the advantageous effects produced, as set forth hereinafter in connection with Figures 8 to 19.

Figure 6:
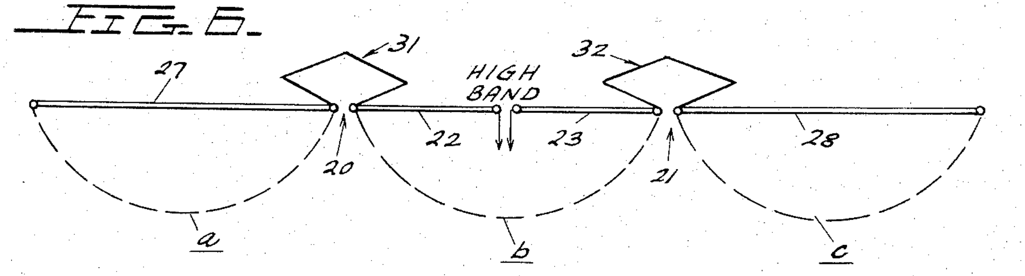
Fig. 6 is a schematic electrical illustration of the effective signal reception condition of the invention antenna for high band television channels.

Figure 6 diagrammatically illustrates the reception position of the exemplary antenna with the reception dipole rods 27, 28 extended in the manner of Figures 2 and 4, and with the dipole arms 20, 21 adjusted to a suitable reception angle. The Figure 6 arrangement is in connection with the reception of a television channel in the high V. H. F. band, namely channels (7) to (13). The separated extended rods 27 and 28 are resonant in the manner to produce half-wave current distribution curves *a* and *c* substantially in the upper frequency range hereof. The central tubes 22 and 23 connected about leads 26, constitute an effective dipole having substantially the same resonant half-wave current distribution curve *b* as do the curves *a* and *c*.

It is to be noted that the three current reception distribution curves *a*, *b*, *c* are all in the same phase and direction of the same order of magnitude, and of or close to resonance in the upper band. The specific resonant frequency for these curves is dependent upon the physical length used for the separate elements of the antenna arms. Resonance at a medial high band channel such as channel 10 would provide effective reception throughout the upper band, whereas it may be desirable to effectuate resonance for the curves corresponding to *a*, *b*, *c* at a lower or higher channel in the high V. H. F. band. In order to permit the three high frequency, efficiently received signals, corresponding to *a*, *b*, and *c* to become additive, and in no way cancel out, there is interconnected between dipole elements 22 and 27 phasing loop 31; and between dipole elements 23 and 28 phasing loop 32. Phasing loops 31 and 32 are proportioned to act as one quarter wave phasing stubs, which cause a reversal of the out-of-phase currents to produce the power equivalent to three tuned dipoles stacked together.

The practical effect of the invention combination is equivalent to three colinear dipoles all interconnected to central leads 26, and providing corresponding reception in the high band for an effective magnitude of received signal equivalent approximately to three times that as would otherwise obtain with conventional dipoles. By providing a telescoping indoor antenna with intermediate phasing loops 31, 32 in the respective dipole arms 20, 21 automatically connected when the dipoles are extended for full reception, the high frequency band channels are effectively received at three times their signal strength as compared to reception with regular prior art telescopic dipoles. The use of the phasing loops 31, 32 connected in series intermediate the dipole arms 20, 21 prevents the phase cancellation of two of the three reception characteristics *a*, *b* and *c* as will be understood by those skilled in the art.

Figures 7, 8, 9:
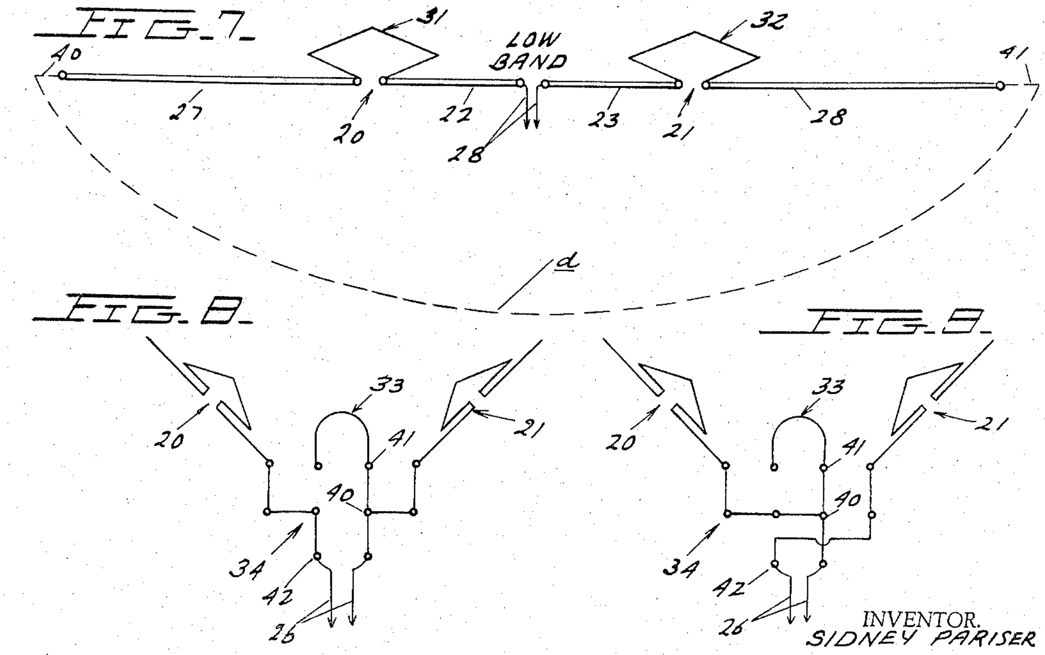
Fig. 7 is a schematic electrical representation of the reception condition of the invention antenna for low band channel reception.
Figs. 8 through 19 are diagrammatic representations of a multiplicity of interconnections between the antenna dipole arms and an auxiliary phasing element.

Figure 7 illustrates the full reception position of the dipole arms 20, 21 for the low band reception of broadcast channels (2) to (6). At these low band frequencies, the phasing loops 31 and 32 are not resonant, and are in fact substantially off resonance. Accordingly, they act like simple conductors and interconnect the respective elements 22 and 27 of dipole arm 22, and 23 and 28 of dipole arm 21. In practice the inter-conducting loops 31, 32 also add effective length to each of their respective dipoles 20 and 21. Thus, the effective reception length of the dipole arms 20 and 21 is substantially increased as indicated by the dotted extensions 40 and 41. Also, the low band operation of the antenna utilizes the dipoles 20, 21 in such effective manner and the half-wave current resonant curve *d* indicates the electrical reception action thereof. Efficient strength of reception for the low channels (2) to (6) is thus provided.

The resonant frequency corresponding to the half-wave length curve *d* is, in practice, proportioned to be resonant to a lower channel, such as channel (2); although resonance to channels (3) or (4) intermediate of the lower band may of course also be utilized. When the half-wave curve *d* for the exemplary antenna corresponds to channel (2), the effective length of the antenna including the full dipole arms 20, 21 and their effective extensions 40 and 41 due to the action of the loops 31, 32 provides substantially the equivalent of 102 inches length. Such length is substantially greater than the actual physical length of the combined dipoles 20, 21 in their extended position, and is due to the effective length contributed by the phasing loops 31, 32 in the low band reception mode.

It is preferred that the orientation of the phasing loops 31, 32 on the indoor antenna hereof be in the plane of and parallel with the dipole arms 20 and 21, as shown in the figures. Further, it is desirable that their physical length be substantially greater in the direction of their respective dipole arms. Towards this end a flat diamond-shaped configuration as illustrated in Figures 1 and 2 has been found effective in practice. The four arms of the diamond phasing loops 31 and 32 in effect form a shallow structure oriented along each of their corresponding dipole arms 20 and 21 to add the important advantages to the indoor antenna hereof enumerated above without adding much to the cost, complexity, bulk or weight to the basic antenna structure.

A further important feature of the invention is the incorporation of the multi-channel switch 34 in conjunction with the auxiliary phasing element 33. Figures 8 to 19 are schematic diagrams of a series of interconnections introduced in the antenna circuitry to effectuate desirable reception results at lead-in 26 for the V. H. F. television reception. In these figures the auxiliary phasing element 33 is diagrammatically illustrated as a simple loop. Its exemplary configuration is shown in Figures 1 and 2 and may take other forms in practice.

Phasing element 33 is a physical unit which introduces inductance and capacity effects to the antenna circuitry in accordance with its physical relationship and electrical interconnection. The dipole antenna arms 20, 21 and the auxiliary phasing loop 33 are interconnected in twelve circuital relationships illustrated in Figures 8 to 19 through twelve position multi-contact switch 34. The indicated switching effects a revolving reception field pattern as the twelve position switch produces its multiple circuitry. This permits the effective rotating of the antenna to the direction of maximum signal by the operator.

The criss-cross auxiliary phasing element 33 is introduced into the circuitry through various switch positions, Figures 8 through 19. Various inductance or capacitance relations are added to the dipoles 20, 21 and so coupled to the television receiver for the most efficient performance in a particular reception situation. As heretofore stated, where ghosts, snow, interference or Venetian blinds affect the TV reception, rotation of the twelve position switch 34 serves to minimize such reception disturbances. While the indicated interconnections of Figures 8 to 19 have been found to be useful in practice, it is to be understood that other types or sequence of interconnections are feasible within the spirit and scope of this invention.

The circuit arrangement of Figure 8 illustrates the dipoles 20, 21 connected directly to lead-in 26 much as the circuit of Figures 6 and 7 but with the additional connection of auxiliary phasing element 33 to terminal 40 of dipole arm 22. In Figure 9 the dipole arms 20 and 21 are reversed in their connection to lead-in 26 as compared to Figure 8 with the auxiliary phasing element 33 remaining connected to terminal 40 but to dipole arm 20.

Figures 10, 11, 12, 13, 14, 15, 16, 17, 18, 19:
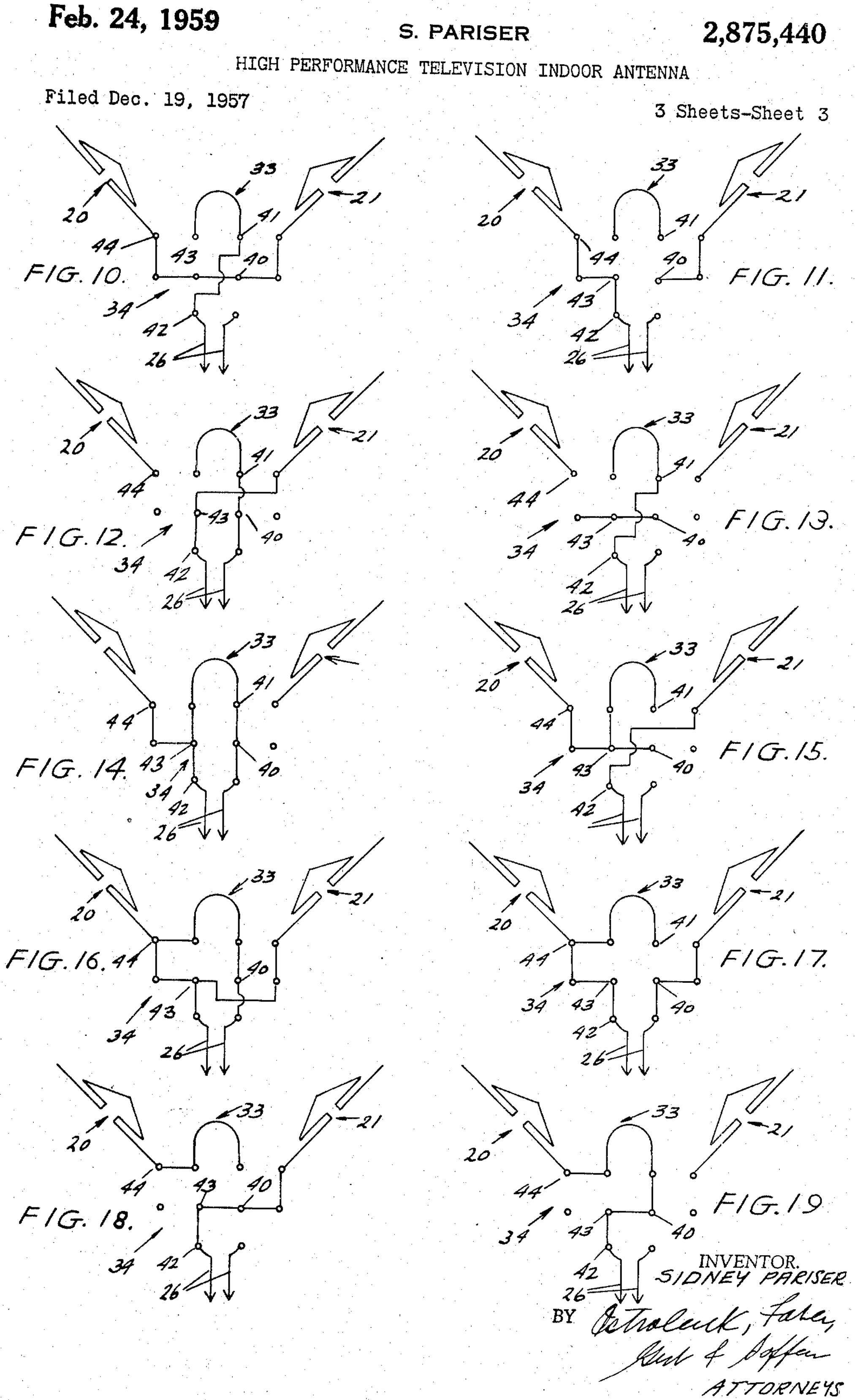

In the circuit arrangement of Figure 10, the dipole arms 20, 21 are interconnected at terminal 40 and to one of the two leads 26. The phasing element is connected at one side 41 to terminal 42 of the opposite lead 26. In Figure 11 both dipole arms are connected symmetrically to the lead-in 26, with the phasing element 33 out of circuit. Figure 11 corresponds identically to the circuit connection of the antenna as illustrated in Figures 6 and 7. In Figure 12 dipole arm 20 is out of circuit, with dipole arm 21 remaining connected to one of the leads 26; the auxiliary phasing loop 33 being connected to terminal 40 and to the opposite lead 26.

The dipole arm 20 in Figure 13 is connected to one lead-in 26, and terminal 40 with dipole arm 21 remaining out of the circuit; the auxiliary phasing element 33 being connected to the opposite lead-in. This circuit is essentially the symmetrical reverse of that of Figure 12.

In Figure 14 dipole arm 20 remains in circuit to lead-in 26, with dipole arm 21 still out of circuit. The auxiliary phasing element 33 however, is interconnected to directly across lead-in 26 through terminals 40, 42. Figure 15, dipole arms 20, 21 is connected to the lead-ins 26 with the auxiliary phasing element 33 connected to dipole 20 at terminal 43; the opposite end of element 33 remaining unconnected. In Figure 16 the dipole arms 20 and 21 are interconnected to terminal 43 at one side of lead-in 26; with the auxiliary phasing element 33 connected across both lead-ins 26 through to terminals 40 and 43.

In Figure 17 the dipole arms 20 and 21 are connected to terminals of lead-in 26, with one side of auxiliary phasing element 33 connected directly to dipole arm 20 at terminal 44. In Figure 18 both dipole arm 20 and phasing element 33 are interconnected merely at terminal 44. The dipole arm 21 is connected to one of the leads 26 through terminals 40, 43 and 42. In Figure 19, only one of the two lead-ins 26 is effectively connected to the antenna elements, as in Figure 18. In the case of Figure 19, the dipole arm 20 is connected in series through terminal 44 with auxiliary phasing element 33, and in turn through terminals 40, 43 and 42, to the lead 26; with dipole arm 21 remaining out of circuit.

In conclusion, the invention indoor antenna is effective for the reception of both the high and low band channels of V. H. F. broadcast television signals. The entire antenna is effective in most metropolitan areas, and in semi-fringe areas, for clearcut reception of the television pictures. With the antenna in its fully extended condition (as indicated in Figure 2), the high band is effectively received at approximately three times the strength of a conventional indoor dipole antenna in view of the novel phasing elements automatically interposed in each of the dipole arms to cancel out negative resonant loops in the signal reception. For the low band channels the same phasing loops effectively add signal strength by effectively increasing the length of the dipole arms over the actual physical length thereof. The auxiliary phasing element interconnected with the dipole arms through the multi-positioned switch, into a plurality of interconnection arrangements is useful in effectively rotating the reception field pattern of the antenna as well as the effective elimination of annoying disturbances in optimizing the dipole reception action.

While the present invention has been described in connection with an exemplary embodiment thereof, it is to be understood that modifications may be made in both its configuration and circuital arrangements without departing from the broader spirit and scope of the invention as defined in the appended claims.

I claim:

1. An indoor antenna of the character described comprising a dipole arm composed of a linear tubular member, a rod telescopically colinear with said tubular member, phasing means supported with said member, and circuit means connecting said phasing means in electrical series between said tubular member and rod, whereby the antenna is rendered substantially more effective in its reception of the higher frequency signals to be received.

2. An indoor antenna of the character described for the reception of television signals comprising a dipole arm composed of a linear tubular member, a rod telescopically colinear with said tubular member, phasing means supported at the rod end of said member, and circuit means connecting said phasing means in electrical series between the facing ends of the said tubular member and rod when said rod is in its extended position, whereby the antenna is rendered substantially more effective in its reception of the upper frequency signals.

3. An indoor antenna of the character described for the reception of V. H. F. television signals comprising a pair of dipole arms each composed of a linear tubular member, a rod telescopically colinear with each tubular member, phasing means supporting said members, and circuit means connecting said phasing means in electrical series between each said tubular member and rod, whereby the antenna is rendered substantially more effective in its reception of the upper V. H. F. band signals and the effective length of said dipole arms are substantially increased over its physical length for the reception of the lower V. H. F. band signals.

4. An indoor antenna of the character described for the reception of V. H. F. television signals comprising a pair of dipole arms each composed of a linear tubular member, a rod telescopically colinear with each tubular member, phasing means supported at the rod end of each member, and circuit means connecting said phasing means in electrical series between the facing ends of each said tubular member and rod when the rod is in its extended position, whereby the antenna is rendered substantially more effective in its reception of the upper V. H. F. band signals and the effective length of said dipole arms are substantially increased over its physical length for the reception of the lower V. H. F. band signals.

5. An indoor antenna as claimed in claim 1, in which said phasing means consists of a loop.

6. An indoor antenna as claimed in claim 2, in which said phasing means consist of a loop substantially in a plane including the dipole arm.

7. An indoor antenna as claimed in claim 3, in which said phasing means consists of a loop substantially in a plane individual to each dipole arm in the form of a diamond.

8. An indoor antenna as claimed in claim 4, in which said phasing means consists of a loop substantially in a plane individual to each dipole arm in the form of an elongated diamond with its elongated dimension generally in the direction of the associated dipole arm.

9. An indoor antenna as claimed in claim 1, further including an insulation element secured to the rod end of the tubular member having contacts connected to said phasing means and engageable electrically with the rod and member.

10. An indoor antenna as claimed in claim 2, further including an insulation element secured to the rod end of the tubular member having contacts connected to said phasing means and engageable electrically with the rod and member to automatically effect said series connection when the rod is in its extended position.

11. An indoor antenna as claimed in claim 3, further including an insulation element secured to the rod end of each tubular member having contacts connected to said phasing means and individually engageable electrically with the rods and members to automatically effect the series connections when each rod is in its extended position.

12. An indoor antenna as claimed in claim 8, further including an insulation element secured to the rod end of each tubular member having contacts connected to the ends of its associated loop and engageable electrically with the rods and members to automatically effect the series connections when each rod is in its extended position.

13. An indoor antenna as claimed in claim 4, further including an insulation element secured to the rod end of each tubular member having contacts to automatically effect the series connections when each rod is in its extended position.

14. An indoor antenna as claimed in claim 6, further including an insulation element secured to the rod end of the tubular member having contacts to automatically effect said series connection when the rod is in its extended position.

15. An indoor antenna as claimed in claim 1, further including a base mounting said dipole arm in a pivoted relation, an auxiliary phasing element, and switching means for said dipole arm and said auxiliary phasing element to effect optimum reception interconnections.

16. An indoor antenna as claimed in claim 2, further including a base mounting said dipole arm in a pivoted relation, an auxiliary phasing element supported on said base, and switching means for changeably interconnecting said dipole arm and said auxiliary phasing element to effect optimum reception connection.

17. An indoor antenna as claimed in claim 3, further including a base mounting said dipole arms in pivoted substantially coplanar coaction, an auxiliary phasing element, and switching means for said dipole arms and said auxiliary phasing element to effect optimum reception interconnections for the television signals.

18. An indoor antenna as claimed in claim 7, further including a central base mounting said dipole arms in pivoted substantially coplanar coaction, an auxiliary phasing element supported on said base, and switching means for changeably interconnecting said dipole arms and said auxiliary phasing element to effect optimum reception connection for the television signals.

19. An indoor antenna as claimed in claim 9, further including a base mounting the dipole arm in a pivoted relation, an auxiliary phasing element, and switching means for changeably interconnecting said dipole arm and said auxiliary phasing element to effect optimum reception connection for the television signals.

20. An indoor antenna as claimed in claim 13, further including a central base mounting said dipole arms in pivoted substantially coplanar coactions, an auxiliary phasing element supported on said base centrally between said dipole arms and switching means for changeably interconnecting said dipole arms and said auxiliary phasing element to effect optimum reception connection for the television signals.

References Cited in the file of this patent

UNITED STATES PATENTS

| | | |
|---|---|---|
| 2,069,513 | Wolff | Feb. 2, 1937 |
| 2,705,283 | Thomas | Mar. 29, 1955 |